United States Patent
Büstgens

(10) Patent No.: US 11,612,901 B2
(45) Date of Patent: Mar. 28, 2023

(54) PRINT HEAD COMPRISING A MICRO-PNEUMATIC CONTROL UNIT

(71) Applicant: EXEL Industries SA, Epernay (FR)

(72) Inventor: Burkhard Büstgens, Gundelfingen (DE)

(73) Assignee: EXEL INDUSTRIES SA, Epernay (FR)

(*) Notice: Subject to any disclaimer, the term of this patent is extended or adjusted under 35 U.S.C. 154(b) by 106 days.

(21) Appl. No.: 17/232,595

(22) Filed: Apr. 16, 2021

(65) Prior Publication Data
US 2021/0323005 A1    Oct. 21, 2021

(30) Foreign Application Priority Data
Apr. 19, 2020   (DE) ...................... 10 2020 002 351.7

(51) Int. Cl.
*B05B 1/32*     (2006.01)
*F16K 99/00*    (2006.01)
(Continued)

(52) U.S. Cl.
CPC ............ *B05B 1/32* (2013.01); *F16K 99/0015* (2013.01); *F16K 99/0048* (2013.01);
(Continued)

(58) Field of Classification Search
CPC .................. B05B 1/32; F16K 99/0015; F16K 99/0048; F16K 99/0055; F04B 7/0076; F04B 7/02;
(Continued)

(56) References Cited

U.S. PATENT DOCUMENTS

| 4,450,375 | A | * | 5/1984 | Siegal | F16K 31/006 310/330 |
|---|---|---|---|---|---|
| 5,065,978 | A | * | 11/1991 | Albarda | F04B 43/046 257/419 |
| 5,323,999 | A | * | 6/1994 | Bonne | F15B 13/0405 251/129.01 |
| 6,142,444 | A | * | 11/2000 | Kluge | F15C 5/00 137/831 |
| 2002/0149296 | A1 | * | 10/2002 | Fujii | B41J 2/14233 310/328 |

(Continued)

FOREIGN PATENT DOCUMENTS

DE    10 2012 006 658    10/2013

*Primary Examiner* — Minh Q Le
(74) *Attorney, Agent, or Firm* — Lott & Fischer, PL

(57) ABSTRACT

A micro-pneumatic control unit comprising a plurality of control channels for generating the control pressures in a pneumatically actuated multi-channel coating head for coating components with a coating agent, a control channel being characterized by a valve element comprising a valve bore in a valve plate and a diaphragm layer which is below the valve plate and is configured as a diaphragm closing element in the region of the valve bore, the shape of which diaphragm closing element defined by recesses positioned laterally with respect to the valve bore, by a micro-actuator having a plunger that actuates the diaphragm closing element through the valve bore such that the valve element opens, by a second micro-pneumatic element connected in series with the valve element, the control pressure developing and a cavity located at the connection node thereof, which cavity is connected to at least one pneumatically operated coating agent ejector, and by a pneumatic pressurization of the micro-pneumatic control unit, which is directed such that, with respect to the valve element, there is a pressure gradient from the diaphragm closing element to the valve bore in the valve plate.

10 Claims, 4 Drawing Sheets

(51) Int. Cl.
  *B41J 2/14* (2006.01)
  *F04B 43/04* (2006.01)
  *F04B 13/00* (2006.01)
  *F04B 7/02* (2006.01)
  *B41J 2/175* (2006.01)
  *B41J 2/045* (2006.01)
  *F04B 7/00* (2006.01)

(52) U.S. Cl.
  CPC ....... F16K 99/0055 (2013.01); *B41J 2/04501* (2013.01); *B41J 2/04581* (2013.01); *B41J 2/14201* (2013.01); *B41J 2/14233* (2013.01); *B41J 2/17596* (2013.01); *B41J 2002/14483* (2013.01); *B41J 2202/05* (2013.01); *F04B 7/0076* (2013.01); *F04B 7/02* (2013.01); *F04B 13/00* (2013.01); *F04B 43/046* (2013.01)

(58) Field of Classification Search
  CPC ..... F04B 13/00; F04B 43/046; B41J 2/14201; B41J 2/04501; B41J 2/04581; B41J 2/14233; B41J 2/17596; B41J 2002/14483; B41J 2202/05
  USPC ......... 251/61, 82, 331; 137/487.5, 831, 522, 137/596.16, 614.19
  See application file for complete search history.

(56) References Cited

U.S. PATENT DOCUMENTS

| | | | |
|---|---|---|---|
| 2006/0244787 A1* | 11/2006 | Enomoto | B41J 2/161 347/63 |
| 2010/0321444 A1* | 12/2010 | Xie | B41J 2/14 347/54 |
| 2012/0207632 A1* | 8/2012 | Usui | F04B 53/1037 417/440 |
| 2012/0237375 A1* | 9/2012 | Schneeberger | F04B 19/006 417/413.2 |
| 2013/0000759 A1* | 1/2013 | Killeen | F16K 99/0015 251/129.01 |
| 2013/0106961 A1* | 5/2013 | Van Brocklin | H01L 21/7624 438/21 |
| 2017/0253034 A1* | 9/2017 | Tsukamoto | B41J 2/14032 |
| 2018/0178224 A1* | 6/2018 | Nakamura | B29C 64/00 |
| 2018/0178533 A1* | 6/2018 | Sakai | B41J 2/175 |
| 2018/0178537 A1* | 6/2018 | Murata | B41J 2/175 |
| 2018/0272709 A1* | 9/2018 | Iwata | B41J 2/04541 |
| 2019/0193396 A1* | 6/2019 | Ohtsu | B41J 2/17596 |
| 2019/0210368 A1* | 7/2019 | Eguchi | B41J 2/1628 |
| 2019/0291420 A1* | 9/2019 | Hara | B41J 2/0455 |
| 2019/0389208 A1* | 12/2019 | Sugai | B41J 2/04581 |
| 2020/0298562 A1* | 9/2020 | Chikamoto | B41J 2/04541 |
| 2022/0032335 A1* | 2/2022 | Li | B05C 5/0225 |
| 2022/0194089 A1* | 6/2022 | Nakamura | B41J 2/175 |
| 2022/0288922 A1* | 9/2022 | Nishimura | B41J 2/04581 |

* cited by examiner

PRINT HEAD COMPRISING A MICRO-PNEUMATIC CONTROL UNIT

CLAIM OF PRIORITY

This application is being filed as a non-provisional patent application under 35 U.S.C. § 111(a) and 37 CFR § 1.53(b). This application claims priority under 35 U.S.C. § 119(a) to German patent application number 10 2020 002 351.7 filed on Apr. 19, 2020, the contents of which are incorporated herein by reference.

FIELD OF INVENTION

The invention relates to the field of print heads for coating agents for printing, coating or dispensing, in short for applying, liquid substances onto surfaces of bodies. In particular, it relates to the application by means of a print head, dosing head, dispenser or other liquid applicators, hereinafter referred to throughout as the print head, which comprises a large number of channels which are arranged in a geometrically regular arrangement, preferably in rows. The invention relates in particular to the field of drop-on-demand application, including fluid jet application, of fluid quantities on the order of magnitude in the range of picoliters, nanoliters, microliters or larger per liquid delivery, of fluids of low to high viscosity (order of magnitude of 1 mPas [millipascal seconds] to 1 Pas [pascal seconds]), which can also contain particles (order of magnitude: up to 0.3 mm [millimeter] particle size) in concentrations of up to 90%, at a delivery frequency of up to the kilohertz range and with a channel spacing of down to well below a millimeter.

BACKGROUND OF THE INVENTION

Possible uses of print heads according to the invention are present in the field of painting, sealing or gluing vehicles of all kinds such as motor vehicles, but also aircraft and ships, in particular in the adhesive bonding of components for such vehicles, primarily using industrial robots (in particular multi-axis articulated arm robots) for moving the heads, or in the field of coating components of any kind, including products from the consumer goods industry, with liquid coating agents, using industrial robots or Cartesian robots, or integrated into single-pass printing or coating systems, and in the field of all coatings required in connection with buildings. The invention also relates to printing using a mobile device.

The present invention is based on print heads or dosing heads which are based on the micro-pneumatic drive principle, as described in DE 10 2009 029946 A1.

Furthermore, WO 2013/139326 A1 discloses a micro-pilot valve which is used in print heads or dosing heads. Such a pilot valve comprises a discrete closing element in a chamber which is connected to a control pressure output. The discrete closing element alternately closes an upper opening which is under ambient pressure or a lower opening which is connected to a pressure supply. The discrete closing element is driven by a plunger which protrudes through the first opening and is actuated from the outside by a piezo bending transducer. In this way, the dead volume of the chamber of the micro-pilot valve can be kept low and high pressure gradients can be achieved in the switching processes. A disadvantage in this case, however, is considerable wear to the lower valve seat and the plunger as a result of the hard closing processes and, as a result, an increase in the stroke of the diaphragm closing element. Another consequence of the hard closing processes is the shortening of the service life of the piezo bending transducers due to the cyclical high mechanical stress peaks. In this regard, it would be desirable to prevent hard interaction of the plunger with a valve seat. Furthermore, discrete closing elements according to WO 2013/139326 A1 that have sufficient hardness and durability have a high mass. When the upper opening is closed, this mass has to be moved out of the lower opening by the pneumatic pressure, which does not allow for rapid closing times and requires the support of separate micro-spring elements.

The problem addressed by the present invention is that of at least partially overcoming the disadvantages known from the prior art and in particular improving the function, service life and performance of a micro-pneumatic control unit according to DE 10 2009 029 946 A1 and of the pilot valve according to WO 2013/139326 A1 while reducing manufacturing costs.

SUMMARY OF THE INVENTION

The micro-pneumatic control unit according to the invention, which has a plurality of control channels, is used to generate the control pressures pc in a micro-pneumatically actuated multi-channel print head for coating components with a coating agent, a control channel being characterized by
  a) a valve element comprising a valve bore in a valve plate and a diaphragm layer which is below the valve plate and is designed as a diaphragm closing element in the region of the valve bore, the shape of which diaphragm closing element is determined by recesses positioned laterally with respect to the valve bore,
  b) a micro-actuator having a plunger that actuates the diaphragm closing element via the valve bore such that the valve element opens,
  c) a second micro-pneumatic element connected in series with the valve element, the control pressure developing and a cavity being located at the connection node thereof, which cavity is connected to at least one pneumatically operated coating agent ejector,
  e) finally, pressurization of the series circuit, which is directed such that, with respect to the valve element, there is a pressure gradient from the diaphragm side to the valve bore.

The valve plate and the diaphragm layer extend over all channels of the micro-pneumatic control unit and can each be manufactured cost-effectively as a contiguous piece. The diaphragm layer forms a diaphragm closing element below the valve bore, which diaphragm closing element is shaped by one or more recesses in the diaphragm layer. The term "below" is in this case to be understood as referring to a first longitudinal side of the valve plate.

In comparison to a discrete diaphragm closing element such as a ball, as proposed in WO 2013/139326 A1, the diaphragm closing element is almost mass-free. Furthermore, a restoring force can implicitly be generated by a suitable diaphragm material, by the diaphragm thickness and by the geometry of the diaphragm recess, which restoring force supports the closing of the valve bore driven by the pressure gradient. The low mass of the diaphragm closing element results in a low impact load on the piezo bending transducer and a short closing time.

In principle, all pneumatic circuits or networks in the art are based on series connections of two or more pneumatic elements, also referred to as pneumatic impedances $Z$, between two pressure levels or a pressure gradient, for example between a high pressure level pH and a low pressure level pL. In this case, each impedance can be composed of further impedances or a network of impedances. Depending on the ratio of the impedances involved, a corresponding pressure level is established at the connection node thereof, the height of which pressure level is between the two pressure levels. An individual pneumatic element can be a linear or non-linear throttle or a valve element, it also being possible for the latter to be regarded as a non-linear throttle in terms of system theory.

The valve bore, which forms a valve element together with the diaphragm closing element, is preferably associated with a first micro-pneumatic (non-linear) impedance Z1, and the second micro-pneumatic element, which can contain any micro-pneumatic impedance or a combination thereof, is preferably associated with a second micro-pneumatic impedance Z2.

The second micro-pneumatic element is preferably, for example, a linear throttle if it is, for example, a simple bore (referred to as a second bore) which opens into the cavity. The second bore can also be a plurality of bores, or a sieve structure, which open into the cavity and are connected in parallel.

In this case, the second bore has a smaller diameter than the valve bore. Depending on the use, the diameter of the valve bore is, for example, 1.5 to 3 times as large as the diameter of the second bore. Expressed more generally, the preferred series connection of the valve element and the second micro-pneumatic element is designed such that, when the valve element is open, there is as high a pressure drop as possible across the second pneumatic element. Depending on the application, the flow resistance of the second pneumatic element should be at least 2, 3, 5, 10 or 20 times as large as that of the valve element in the open state.

Conversely, the total available pressure difference from the high pressure level pH and the low pressure level pL across the valve element always drops when the valve bore is closed by the diaphragm closing element.

The position of the valve element and the second micro-pneumatic element can be interchanged within the series connection, as long as it is ensured that there is a pressure gradient across the valve element from the diaphragm closing element to the valve bore, in order to be able to close said valve bore in a pressure-assisted manner by means of the diaphragm closing element. In principle, the force of the plunger acts on the diaphragm closing element in the opposite direction, i.e., counter to the pressure gradient, in order to lift the diaphragm closing element from the valve bore and allow air to flow through. The position of the valve element and the second pneumatic element within the pneumatic series connection results in various embodiments of micro-pneumatic control units, which are described below with reference to the drawings.

There is a special case if the valve bore is subjected to a low pressure or pressure level pL (L=LOW), for example ambient pressure, and the second bore is subjected to a higher operating pressure or a high pressure level pH (H=HIGH) and if, furthermore, the second bore is arranged at a small distance (for example 20 μm [micrometers] to 100 μm) below the valve bore and thus comes within the range of action of the diaphragm closing element. For example, the valve bore and second bore can be arranged concentrically or the central axes thereof can be offset by a small distance. If the vertical distance between the valve bore and the second bore in the cavity is small, the diaphragm closing element is located in the lower position thereof, close to the second bore. In this position, the horizontal gap flows on the lower face of the diaphragm closing element, which flows are radial with respect to the second bore, are decisive for the flow resistance of the second micro-pneumatic element, and the non-linearity thereof increases greatly. The flow resistance of the second micro-pneumatic impedance Z2 becomes infinite in the case of complete sealing, i.e., when the diaphragm closing element is in contact with the mouth region of the second bore in the cavity. In this case, the control pressure pc assumes the value of the low pressure level pL.

A disadvantage of this configuration is that, for a complete seal of the lower micro-opening with respect to the operating pressure (high pressure level) pH, a high force has to be applied by the actuator, for example a piezo bending transducer, and, in the lower position, the piezo bending transducer is already in a strongly deflected state within its operating range, and the force reserve thereof for closing the second bore counter to the operating pressure is therefore small. Another disadvantage is that the plunger now permanently strikes the lower micro-opening through the diaphragm, which causes a high degree of wear and is a high impact load which shortens the service life of the piezo bending transducer.

These disadvantages can be partially mitigated. The plunger and the piezo bending transducer associated therewith are configured and controlled depending on the application such that the load-free, technically possible operating range of the actuator, measured on the contact surface of the plunger, is between 20 μm, 40 μm, 60 μm or 100 μm above and 40 μm, 60 μm, 100 μm or 150 μm below the sealing surface of the valve bore. In the upper position, the contact surface of the plunger is therefore located above the sealing surface of the upper micro-opening, so that it does not touch the diaphragm closing element. Alternatively, the central position or zero position of the contact surface of the plunger within the operating range can be used as a criterion for a reference alignment of the piezo bending transducer, which, in the case of a bimorph piezo bending transducer is present, for example, when said transducer is electrically and mechanically stress-free or, in the case of a monomorph piezo bending transducer, can simply be defined as the center of the operating range.

The operating range of a micro-actuator is preferably set such that the central position or zero position of the operating range of a micro-actuator is located as far as possible below the sealing surface of the valve bore, for example at a distance of 20 μm, 40 μm, 60 μm, 100 μm or 150 μm. However, the central position can also be placed virtually below the mouth of the second micro-bore, because the lower it is, the higher the actuation forces F are which are available in order to achieve a good sealing effect at the mouth of the second micro-bore. In this case, however, the piezo bending transducer must be operated overall with a high total deflection, i.e., have a large operating range, which has an unfavorable effect on the force and lower natural frequency thereof. In order to keep the closing forces at the mouth of the second micro-bore small, the diameter of the lower micro-bore has to be selected to be sufficiently small, for example 50 μm to 300 μm. In this way, however, the flow resistance of the second bore becomes relatively large and there is a (non-linear) throttle having a high pressure drop and the time constant of the pressure build-up in the cavity is impaired.

The operating range is preferably selected such that the upper position of the operating range is located slightly above the position of the sealing surface of the valve element. According to the force profile of a piezo bending transducer, which progresses upward within the operating range, a high actuating force Fopen is available in this position for opening the valve element. In a preferred design of the actuation, this is at least ⅔ of the maximum actuating force Fmax available in the upper position of the operating range. In this regard, it should be mentioned that, in the case of a bimorph piezo bending transducer, for example, a deflection into the upper position of the operating range occurs as a result of electrical voltage being applied to the upper lamella (contraction), and the piezo bending transducer is under maximum mechanical preload in the upper position of the operating range. If the upper piezo lamella is then discharged and voltage is simultaneously applied to the lower lamella, the mechanically induced preload resulting from the existing deflection and the piezoelectrically induced preload add up. Thus, the maximum actuating force Fmax available for the actuating task in the upper position of the operating range is twice the clamping force which characterizes a piezo bending transducer in the zero position.

It should be noted that these considerations regarding the design of the operating range and the location of the central position of the micro-actuator are preferably also valid if there is no direct pneumatic interaction of the second bore with the diaphragm closing element and the second bore opens into the cavity at another point. Since there is then no need to apply a high force reserve to seal a valve hole with respect to an operating pressure at some distance below the valve element, the smaller of the specified operating ranges are sufficient here, which has a positive effect on the service life, force and natural frequency of the micro-actuators. It should further be noted that, in this case, the second bore can, in principle, open out at any other point of the total dead volume, for example into the cavity, the pneumatic actuation chamber of the ejector and the connection therebetween.

It should also be noted that the valve bore has a diameter of 0.3 mm [millimeters], 0.4 mm, 0.5 mm, or 0.8 mm, depending on the application, and the second micro-bore has a diameter of 0.1 mm, 0.15 mm, 0.2 mm or 0.3 mm, depending on the application. Furthermore, the valve bore and the second bore have to be dimensioned such that, depending on the application, pneumatic switching times of 0.05 ms [milliseconds] to 1 ms or 0.5 ms to 5 ms can be achieved. Depending on the application, the cavity, fluid ejector and intermediate connection are dimensioned such that the combined pneumatic dead volume is in the range of 1 µL [microliters], 2 µL, 4 µL or 10 µL. The connection between the cavity and the fluid ejector is, for example, between 0.2 mm and 0.5 mm and the length is between 2 mm and 8 mm.

It should also be noted that a stop can be located in the region below the valve element, which stop is used to initialize the position of the actuator (including the plunger), for example the zero position or another reference position, for example during assembly. During assembly, the piezo lamellae of the piezo bending transducer are first put into a defined charge state or defined electrical voltages are applied, and then the actuator, including the plunger, is positioned against the stop, for example by means of adjusting screws.

The stop can be within the operating range of the actuator with respect to the contact surface of the plunger. In this case, the stop also acts as a stop or stroke limiter for a lower diaphragm position of the diaphragm closing element during operation. This is the case, for example, when the second micro-bore interacts with the diaphragm closing element as a valve seat. For example, it can be specified for this case that, in the case of a bimorph piezo bending transducer, the lower diaphragm position is to coincide with the zero position or the central position of the operating range of the bimorph piezo bending transducer. In this case, the full unilateral deflection of said bimorph piezo bending transducer from the zero position to the upper position of the operating range is available, and the full clamping force of the piezo bending transducer in the zero position is available for sealing the second bore with respect to the operating pressure (the high pressure level) pH at the level of the lower diaphragm position. It should be noted that this consideration applies analogously to a monomorphic piezo bending transducer, but in this case only half of the maximum clamping force Fmax with respect to the stress-free zero position of the transducer, i.e. Fmax/2, is available for the sealing. It should be noted that inaccuracies in location and position of up to 20% to 30% of the operating range have to be taken into account, and the inventive teaching is not limited to the cases in which the precise locations and positions are maintained.

The stop can also be outside (below or above) the operating range of the actuator, with respect to the contact surface of the plunger. In this case, the stop is not touched by the diaphragm closing element while the micro-pneumatic control unit is in operation. In order to use a stop outside the operating range of the actuator, said actuator is actuated for the initial alignment process outside the electrical operating range thereof used during operation. For example, if the stop is below the operating range of the actuator, in the case of a piezo bending transducer, the lower piezo lamella is actuated using an overvoltage Ve which is higher than the operating voltage U and/or the upper lamella is also actuated with opposite polarity.

While the design of the micro-pneumatic control unit described here and the mode of operation thereof, as explained above, already offer optimum utilization of the force profile of a piezo bending transducer and, at the same time, keep the pulse load for opening the valve element low, further precautions can still be taken in order to keep impact loads of the piezo bending transducers low. These include the use of elastomeric materials at various points of the actuation line and are described below with reference to the drawings.

As a precaution, it should be noted that the numerals used here ("first," "second," . . . ) are primarily (only) used to distinguish between a plurality of similar objects, sizes or processes, i.e., in particular do not specify any dependency and/or sequence of these objects, dimensions or processes with respect to one another. Should a dependency and/or sequence be required, this is explicitly stated here or is obvious to the person skilled in the art upon studying the specifically described embodiment.

The invention and the technical environment are explained in more detail with reference to the drawings. It should be noted that the invention should not be limited by the shown embodiments. In particular, unless explicitly stated otherwise, it is also possible to extract partial aspects from the facts explained in the drawings and to combine them with other components and insights from the present description and/or drawings. In particular, it should be noted that the drawings and in particular the size ratios shown are only schematic. The same reference signs denote the same objects, and explanations from other figures can therefore be used in a supplementary manner if necessary.

DETAILED DESCRIPTION OF THE INVENTION

Figure 1:
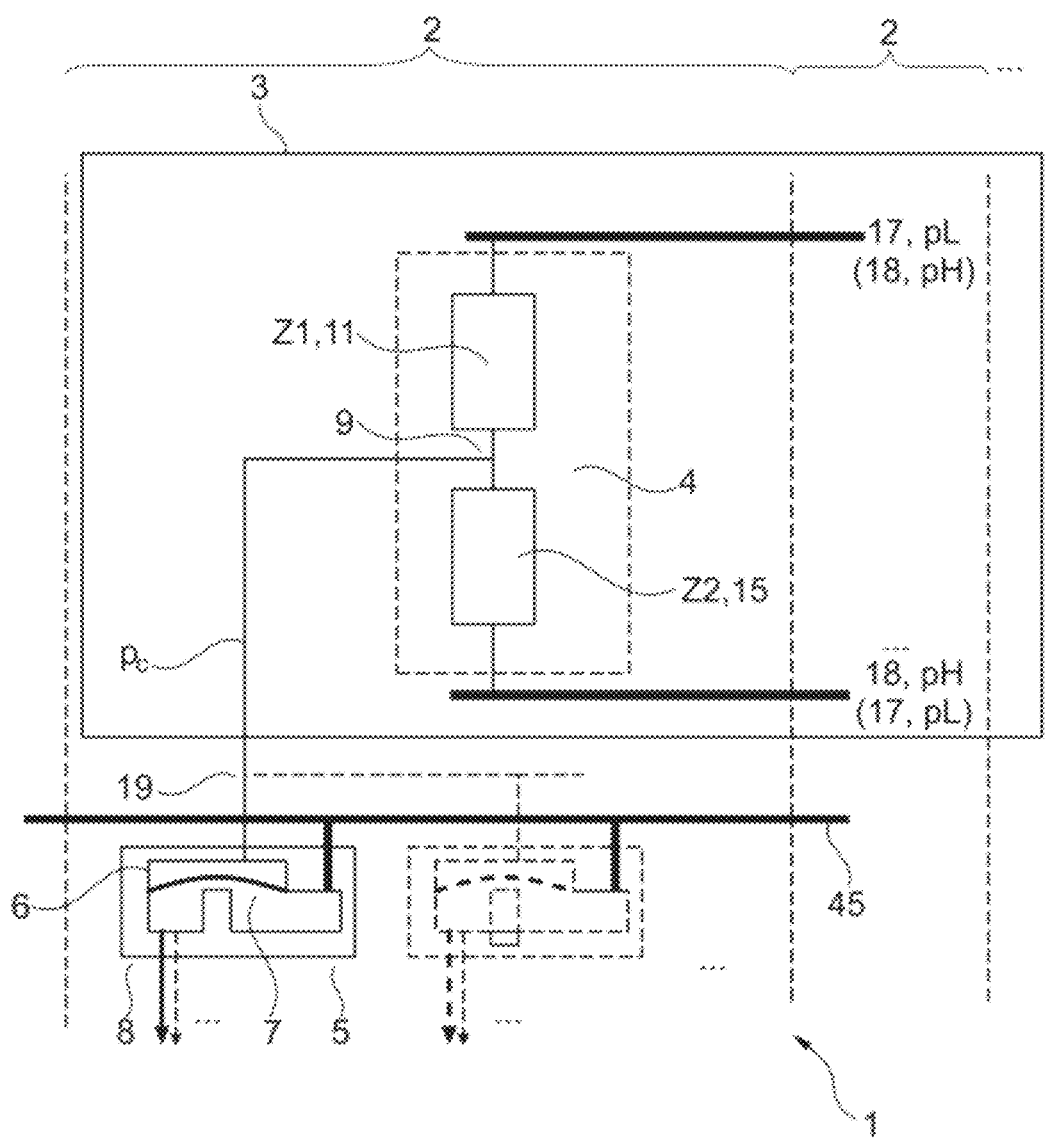
FIG. 1 shows the functional principle of a micro-pneumatically operated print head of the type in question using a pneumatic circuit diagram.

Various terms within this description may be used in ways that differ from the general definitions. The following definitions apply:

The attribute "micro" in connection with micro-pneumatic elements is intended to indicate that one or more dimensions which substantially determine the function of the component are predominantly between 1 μm and 999 μm.

The attribute "micro" in connection with an actuator describes the property of an actuator to generate actuating movements in the range of well below a millimeter, for example between 0 and 300 μm.

The term "ambient pressure" in this case refers to the lower or low pressure level pL in contrast to the higher operating pressure (high pressure level) pH. The term ambient pressure also includes pressures that are higher or lower than ambient pressure. For example, instead of the ambient pressure, a negative pressure can in principle also be used, which can increase the efficiency of the print head.

A "channel" 2 refers to the smallest unit of the coating head or print head 1 that can be individually electrically controlled.

For purposes of clarity and ease of reference, following is a description of various components shown in the drawings and their corresponding reference designations:

1 print head
2 channel
3 micro-pneumatic control unit having a large number of channels
4 micro-pneumatic network
5 fluid ejector
6 actuation chamber
7 fluid diaphragm valve
8 fluid outlets
9 cavity
10 valve plate
11 valve element
12 valve bore
13 sealing surface of the valve element
14 second plate
15 second micro-pneumatic element
16 second bore
17 first (low) pressure level, ambient pressure pL
18 second (high) pressure level, operating pressure pH
19 connection to the fluid ejector
20 diaphragm layer
21 diaphragm closing element
22 recess
23 upper diaphragm position
24 lower diaphragm position
25 micro-actuator including plunger, in particular monomorph or bimorph piezo bending transducer
26 plunger
27 contact surface of the plunger
28 load-free operating range
29 central position, zero position of the operating range
30 upper position of the operating range
31 lower position of the operating range
32 stop
33 reference position
34 base plate
35 common pressure supply
36 second valve element
37 piezo lamellae
38 housing
39 spacer plate
40 screw connection
41 screw connection plate
42 resilient element
43 central electrode
44 lower piezo lamella
45 fluid supply
pH high pressure level, operating pressure
pL low pressure level, ambient pressure
U voltage
V0 voltage
V1 voltage
Ve overvoltage
ξ deflection
ξ1 deflection FIG. 1 shows the functional principle of print heads 1 comprising a plurality of channels 2, which operate according to the electro-pneumatic operating principle. Each channel contains one or more fluid ejectors 5, which substantially contain a fluid diaphragm valve 7, the fluid diaphragm of which is actuated by means of a pneumatic control pressure pc via an actuation chamber 6. In the normal state, an overpressure prevails in the actuating chamber 6 in relation to the fluid pressure in a fluid supply 45, and the fluid diaphragm valve 7 is therefore closed. Venting of the actuation chamber 6 opens the fluid diaphragm valve 7 due to the fluid pressure, and the fluid exits through the one or more fluid outlets 8, an ejection of droplets taking place in the case of short venting times in the range of, for example, less than 1 ms, 2 ms or 5 ms, and a fluid jet being emitted in the case of a longer venting time. For a more detailed description, reference is made to DE 10 2009 029946 A1.

The required control pressures pc for all channels 2 are generated in a micro-pneumatic control unit 3 from two available pressure levels: a low pressure level 17 (pL), e.g., the ambient pressure (as referred to below), and a higher (high) pressure level, the operating pressure 18 (pH). Depending on the embodiment, these can also be reversed (values in FIG. 1 between parentheses).

The following statements relate to any individual channel from the micro-pneumatic control unit 3: a micro-pneumatic network 4 in the form of a series circuit comprising substantially of two micro-pneumatic impedances Z1 and Z2, which can each consist of a network of additional impedances, is clamped between the operating pressure pH and ambient pressure pL. At the connection node of said impedances, there is a cavity 9 which is connected to the actuation chamber 6 of the fluid ejector 5 via a connection 19 which is as short as possible. Proportionally to the magnitude of the impedances Z1 and Z2, a control pressure pc is established analogously to electrical voltage divider rules in the cavity 9. The micro-pneumatic impedance Z1 contains a valve element 11 which is actuated via a micro-actuator 25 and the micro-pneumatic impedance Z2 contains a second micro-pneumatic element 15 at which a pressure drop occurs when the valve element 11 (from Z1) is open.

Figure 2:
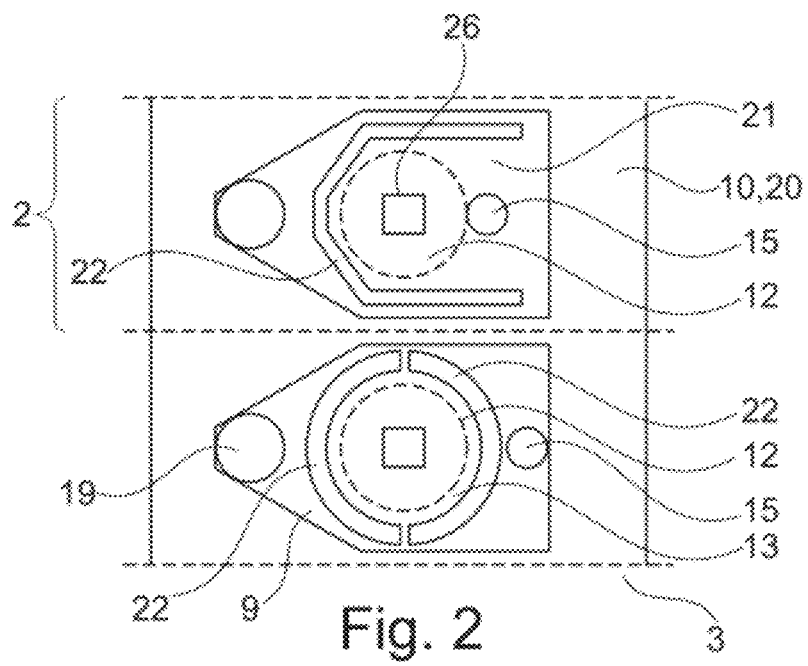
FIG. 2 is a plan view of a pneumatic network having n=2 channels. The valve plate and diaphragm layer are shown as transparent.
Figure 3:
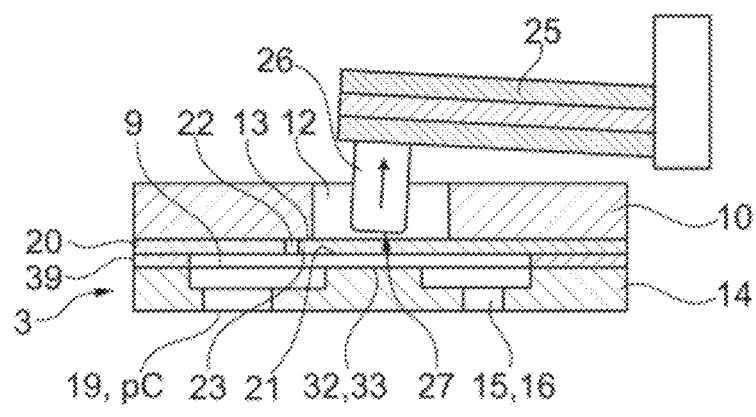
FIG. 3 shows a cross section through an embodiment of a micro-pneumatic control unit for generating a control pressure pc, shown in the ventilated state.
Figure 4:
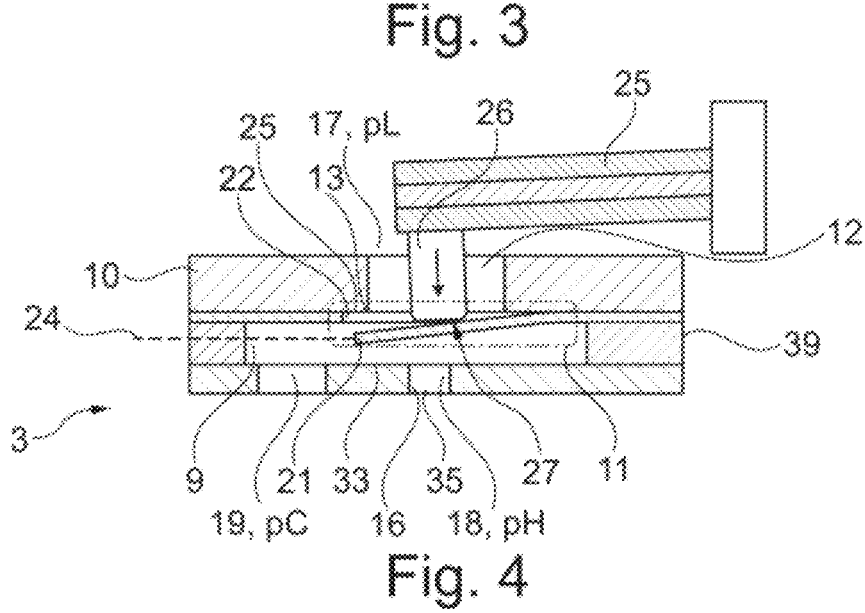
FIG. 4 shows a cross section through an embodiment of a micro-pneumatic control unit for generating a control pressure pc, shown in the vented state.

FIGS. 2 and 3 show a first embodiment, FIG. 4 shows a slight modification thereof. FIG. 3 shows the cross section through a channel 2 of the micro-pneumatic control unit 3. The term perpendicular in this case refers to a perpendicular direction as shown in FIG. 3.

The cavity 9 is delimited at the top by a diaphragm layer 20, which in turn is located below a valve plate 10 which has a valve bore 12 in the region of the cavity 9. The diaphragm layer 20 covers the valve bore 12 and has recesses 22 which allow air to pass through the diaphragm layer 20 with little resistance and define the shape of a movable diaphragm closing element 21 which ultimately forms a valve element 11 together with the valve bore 12. The valve bore 12 can be designed as a circular hole or have any other shape, for example an oval or elongate shape, or have a corresponding cross section. The one or more recesses 22 are shaped, for example, in such a way that, as shown in the top of FIG. 2, a diaphragm closing element 21 in the shape of a tongue results, which is connected on one side to the remaining diaphragm layer 20 and defines its position.

In FIG. 4 it can be seen that such a tongue-shaped diaphragm closing element 21, in the deflected state, lifts off from the valve plate 10 on one side (the left-hand side in the picture) when said diaphragm closing element is deflected by a plunger 26. In this case, the plunger 26 can also be arranged eccentrically in the valve bore 12 or at one end of the valve bore 12, provided that said valve bore is, for example, elongate. This can have the advantage that the diaphragm closing element 21 can first be opened on one side during the movement by the plunger 26, such that a lower actuation force F is required.

In FIG. 2, below, two semicircular or semicircular annular recesses 22 are sketched as a further embodiment, which recesses result in a further shape of the diaphragm closing element. Furthermore, a larger number of circularly arranged recesses 22 at a certain distance from the valve bore 12, or other possibilities, can be used, but a certain minimum distance of, for example, 20 μm to 100 μm from the edge of the valve bore should at no point not be reached. Together with a certain shape of the diaphragm closing element 21, a certain restoring force can be implemented, for example by means of a defined diaphragm flexural strength, in order to support the closing process of the diaphragm closing element 21, which is otherwise achieved solely by the overpressure in the cavity 9, by means of the implicit restoring force of said closing element and thus to shorten the closing time. However, this assumes that the diaphragm closing element 21 is designed such that its fundamental natural frequency ω is considerably greater than 1/Ts (Ts=closing time).

The cavity 9 is delimited at the bottom by a second plate 14 which contains a second micro-pneumatic element 15 in the form of a bore, referred to as the second bore 16, and also contains the pneumatic connection 19 to the actuation chamber 6 of the fluid ejector 5. In this case, the valve bore 12 is connected to the ambient pressure pL and the second bore 16 is connected to the operating pressure pH via a pressure supply line 35 (FIG. 7) within a base plate 34 that is used jointly for all channels 2. In the closed state of the valve element 11, the operating pressure pH is established in the cavity; in the open state, air flows through the second bore 16 in FIG. 3 and FIG. 4 and through the valve element 11 in a stationary manner, from the pressure supply 35 to the ambient pressure-side end of the valve bore 12. The control pressure pc developing in the cavity 9 then corresponds to the ratio of the flow resistances thereof.

The open valve element 11 (taking into account the diaphragm deflection and the associated design of the micro-actuator) and the second bore 16 are dimensioned with respect to the flow resistances thereof such that the control pressure pc assumes a value of between 5% and 20% of the operating pressure PH. Guide values for suitable bore diameters can be found above in the description. In order to achieve a constantly large opening gap of the valve element 11, a stop 32 can be used, as indicated in FIG. 3. In the illustrated case, said stop is mounted, for example, below the height of the diaphragm layer 20 at a distance of 30 μm to 100 μm and is located, for example, within the operating range 28 of the micro-actuator 25. In FIG. 4, however, a reference position 33 is sketched instead of the stop 32, which reference position is located at a greater distance from the diaphragm layer. The diaphragm closing element 21 of the valve element 11 is also shown in the lower position 31 of the operating range 28 of the micro-actuator 25 or in the lower diaphragm position 24. The reference position 33 is located so far below the lower position 31 of the operating range 28 that the diaphragm closing element 21 does not come into contact with the reference position 33 during operation. Thus, there are also no load peaks in the piezo bending transducer 25 in connection with periodic impact loads.

FIGS. 3 and 4 each also show a spacer plate 39 of a different thickness, which spacer plates partially laterally delimit the cavity 9. By using spacer plates, the vertical boundary conditions that determine the actuating paths and operating ranges are set.

Furthermore, a micro-actuator 25 in the form of a bimorph piezo bending transducer is shown in FIGS. 3 and 4. The plunger 26, which protrudes through the valve plate 10 and acts on the diaphragm closing element 21 at a contact surface 27 formed at the bottom, is fixedly connected to the movable end of the piezo bending transducer 25. The micro-actuator 25 is shown in FIG. 3 in the upper position 30 of the operating range 28 thereof, which upper position is located, for example, at a distance of 20 μm, 40 μm, 60 μm or 100 μm above the sealing surface 13 of the valve element 11. This distance is necessary in order to prevent the diaphragm closing element 21 from touching the plunger 26 when the valve element 11 is closed, and thus to prevent leaks.

The micro-actuator 25 is shown in FIG. 4 in the lower position 31 of the operating range 28 thereof, in which the diaphragm closing element 21 is also located in the lower position 24 thereof at the same time. The distance between the contact surface 27 of the plunger 26 and the sealing surface 13 of the valve element 11 is then, for example, 40 μm, 60 μm, 100 μm or 150 μm.

With reference to FIG. 2, it should be noted that the typical width of a channel 2 for higher resolution coating applications, for example for the application of low to medium viscosity paints, is between 0.7 mm and 1.5 mm, for wall paints from the construction sector is 1.5 mm to 3 mm and for uses with higher viscosity adhesives and sealants is greater than 2 mm.

Figure 5:
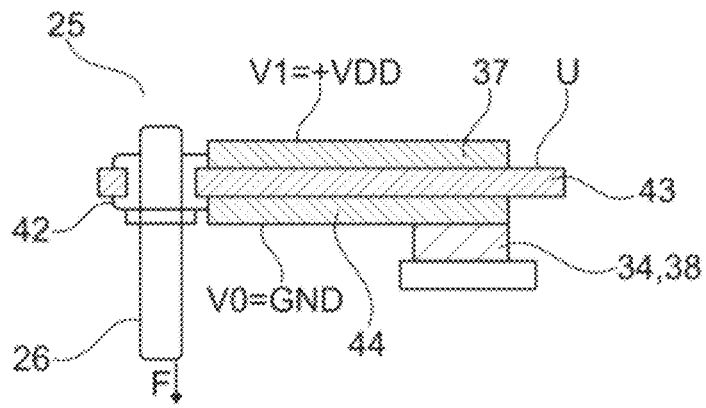
FIG. 5 shows a cross section through a micro-actuator in the form of a bimorph piezo bending transducer together with a plunger and its fastening for actuating the valve element.

A micro-actuator 25 is shown in FIG. 5, which comprises a bimorph piezo bending transducer having a central electrode 43 and a plunger 26 connected to said transducer at the movable end thereof. The plunger 26 is connected to the piezo bending transducer via a resilient element 42 made of an elastomeric material, which reduces the transmission of high mechanical stress peaks which arise, for example, when the contact surface of the plunger 26 strikes the stop. This is used to improve the service life of the piezo bending transducer 25. The piezo bending transducer 25 is, as shown, fixedly clamped or glued to the screw connection plate 41, the base plate 34 and the housing 38 of the print head 1. The piezo bending transducer 25 is actuated, for example, by applying a fixed electrical voltage V1=+VDD to the upper piezo lamella 37 and by applying a ground connection V0=GND to the lower piezo lamella 44. The voltage and polarity of the piezo lamellae 37, 44 are usually always rectified. The voltage U at the central electrode 43 is switched between +VDD and GND. If the voltage U=GND is present at the central electrode 43, a voltage difference of +VDD is present at the upper piezo lamella 37, which contracts said lamella laterally and deflects the piezo actuator upward into the upper position 30 of the operating range 28 thereof (see also FIG. 6). Conversely: If the voltage U=+VDD is present at the central electrode 43 of the piezo bending transducer 25, the voltage difference of +VDD is present at the lower piezo lamella 44, which deflects the piezo actuator downward into the lower position 31 of the operating range 28 thereof. The deflection x of a load-free piezo bending transducer 25, which is measured symmetrically about the zero position (electrically and mechanically stress-free position of the piezo bending transducer 25), therefore moves within the operating range 28 of the piezo bending transducer 25.

If the actuation force F (where U=+VDD, force in the negative z-direction) available for actuating the diaphragm closing element 21 is considered as a function of the deflection x, then, above the zero position 29, the force resulting from the mechanical stresses caused by the pre-deflection of the piezo bending transducer 25 which is highest in the upper position 30 of the operating range 28 of the micro-actuator 25, is added to the constant piezoelectrically generated force. This corresponds to twice the clamping force of the piezo actuator, which, as a parameter, denotes the maximum actuation force when the deflection of the piezo bending transducer 25 is suppressed by clamping, i.e., becomes zero. This force is available in the negative z-direction for the actuation when a voltage +VDD is applied to the central electrode 43 in the upper position 30 of the operating range 28.

Advantageously, while the print head 1 is in operation, the entire operating range 28 for operation in the z-direction can be changed and displaced within certain limits by setting the voltage V1 to be different from +VDD, or by setting the voltage V0 to be different from GND, or by not switching the voltage U alternately between +VDD and GND, but instead between values that differ therefrom. In this case, the following can be stated: an increase in the operating range can only be achieved by increasing the voltage swing $\Box$U of the two switching positions at the central electrode 43. A displacement of the operating range 28 can be achieved, for example, by changing the voltage V1 and/or V0 with respect to the voltage profile of the voltage U at the central electrode. For example, a displacement of the position of the operating range 28 in the negative z-direction can only be achieved by reducing the voltage V1, see the deflection $\xi 1$ (dashed line). In this case, it should be noted that the upper piezo lamella 37 is operated with a negative voltage difference (V1−VDD) when the central electrode 43 is actuated with +VDD and the micro-actuator 25 is located in the lower position of the (new) operating range 28. Due to the risk of depolarization of the piezo material, however, such measures can only be carried out to a very limited extent. However, it is expedient to use this measure in order to finely adjust the position of the operating range 28 of a bimorph piezo bending transducer 25 to the position of a stop 32, a reference position 33, a valve seat or to the sealing surface 13 of the valve element 11. Thus, for example, minor changes which occur during long-term operation can be compensated during operation. It should be noted here that equivalent effects can also be achieved by varying the voltages V0 or U according to the same criteria. Possible case distinctions and combinations are not to be examined in more detail here, but can be carried out at any time by a person of average skill in the field of electrical engineering, in order to derive case-specific, adequate solutions.

Figure 6:
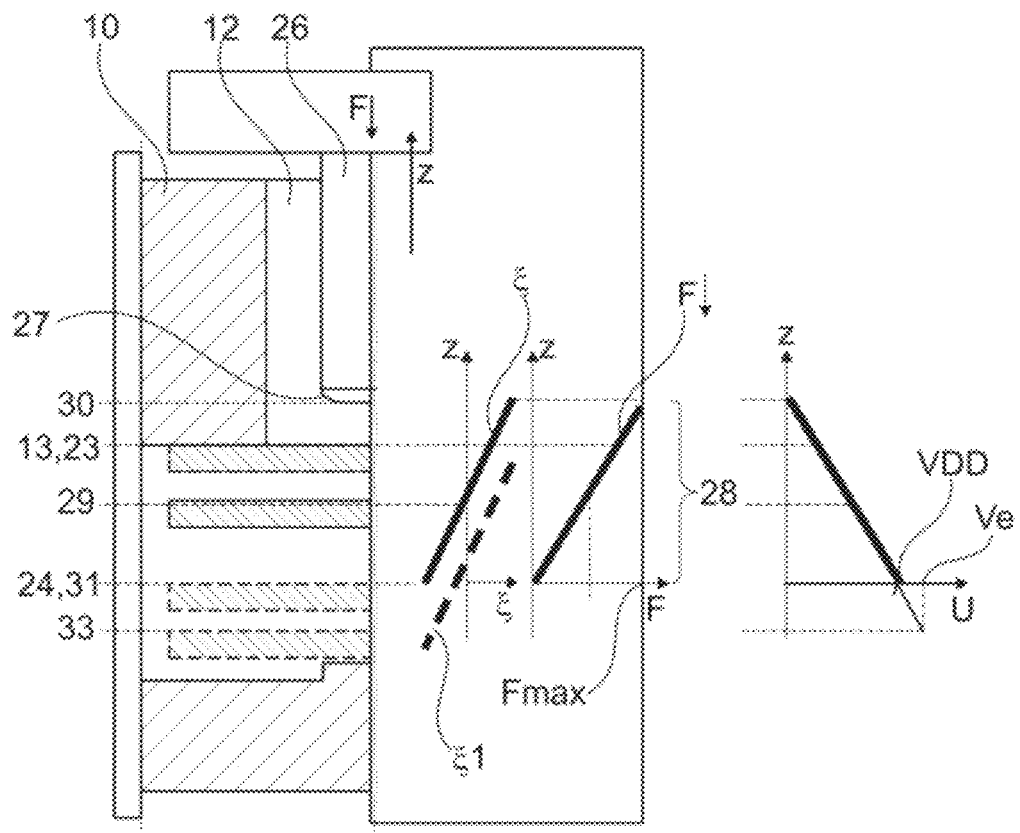
FIG. 6 explains, in an enlarged view, the relationships in connection with the actuation of a micro-pneumatic control unit by means of a bimorph piezo bending transducer.

FIG. 6 illustrates these relationships in a plurality of diagrams for a freely movable (unclamped) piezo bending transducer 25 under static conditions. The voltage U at the central electrode 43 and the resulting z-position measured at the contact surface 27 of the plunger 26 are shown on the right-hand side. The center diagram shows the resulting actuation force F available in the negative z-direction, by means of which the opening of the valve element 11 is actuated. Said actuation force is at zero (0) at the lower position 31 of the actuating range 28, i.e., there are no actuating forces F available there, and is Fmax at the upper position 30 of the operating range 28. The actuating force F thus increases from the bottom to the top and the highest actuating forces F in the negative z-direction are available close to the upper position 30. The deflection x about the zero position or central position of a stress-free piezo bending transducer 25 is also shown on the left.

The micro-actuator is advantageously oriented with respect to the actuation of the diaphragm closing element 21 such that the position of the sealing surface 13 of the valve element 11, or the upper diaphragm position 23, is as close as possible below the upper position 30 of the operating range 28 of the bimorph piezo bending transducer 25, such that at least two thirds (⅔) of the maximum actuation force Fmax are available for opening the diaphragm closing element 21. This design is illustrated on the left-hand side in FIG. 6 by the position of the valve element 11, the contact surface 27 of the plunger 26 and the various positions of the diaphragm closing element 21. The plunger is shown in the upper position 30 of the operating range 28. In this preferred position, the distance between the plunger 26 and the sealing surface 13 of the valve element 11 is at most one third (⅓) of the (load-free) operating range 28, but at least 20 μm or 40 μm depending on the application. It is also made clear that, in the corresponding design, the central position 29 (in the case of a monomorph piezo bending transducer 25) or the zero position 29 (in the case of a bimorph piezo bending transducer 25, to which the right-hand diagrams in FIG. 6 relate) is below the sealing surface 13 of valve element 11, for example at a distance of 20 µm, 40 µm, 60 µm, 100 µm or 150 µm, as mentioned above. Furthermore, the case according to FIG. 4 is shown, in which the lower position 31 of the operating range 28 coincides with the lower diaphragm position 24, i.e., no lower stop is contacted during operation.

This design is particularly suitable for ensuring a long service life of the piezo bending transducers, since, in this case, a certain impact load occurs at most when the diaphragm closing element 21 is contacted, but said impact load is low, since the contacting takes place close to the static upper position 23, where the movement of the plunger 26 still has a low momentum.

FIG. 6 also illustrates the manner in which a reference alignment of the (bimorphic) piezo bending transducer 25 can be carried out at a reference position 33 which is located below the lower position 30 of the operating range 28 of the (bimorph) piezo bending transducer 25. As already described, said transducer is actuated for the initial alignment process outside the electrical operating range thereof used during operation. In the example shown, in the case of a bimorph piezo bending transducer 25, said transducer is actuated with an excessive voltage Ve>+VDD. Alternatively or in addition, the upper piezo lamella 37 can be actuated with opposite polarity by reducing the voltage V1 applied to the upper piezo lamella 37, for example by 30%, this extending along the bending transducer and causing a further increase in deflection in the negative z-direction.

Figure 7:
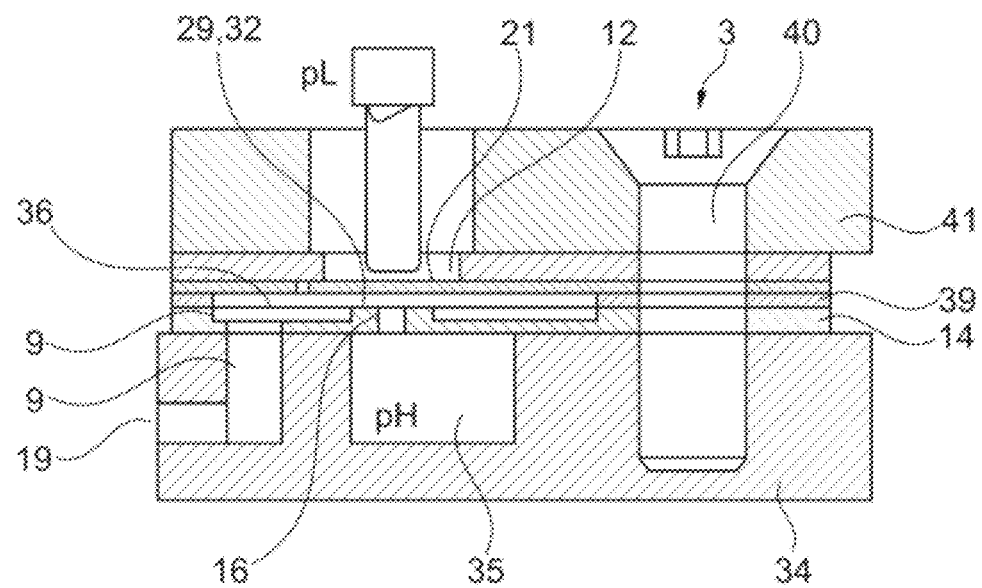
FIG. 7 shows a cross section through a channel of a special variant of the micro-pneumatic control unit, in which the second bore is provided below the first valve element at such a small distance that it forms a second valve element in interaction with the diaphragm closing element. The screw connection concept is also shown.

FIG. 7 illustrates a case, which differs from FIG. 3, in which the second bore 16 is located directly below the valve bore 12, within the range of action of the diaphragm closing element 21. As a result, the combination of diaphragm closing element 21 and second bore 16 creates a second valve element which is actuated by means of the same micro-actuator 25 and the same diaphragm closing element 21 as the valve element 11.

It proves advantageous, as in the embodiment according to FIG. 3, to use a spacer plate 39 of a defined thickness in order to determine the stroke of the diaphragm closing element 21, which is the distance between the upper diaphragm position 23 and the lower diaphragm position 24, in this way. From a pneumatic point of view, it has proven to be expedient to adjust the stroke to 50 µm (30 µm to 80 µm) by using a spacer plate 39 of an appropriate thickness.

In order to achieve a sufficient sealing effect of the second bore 16 with respect to the operating pressure 18 in the lower diaphragm position 24, in this position the micro-actuator 25 must not operate near the lower position 31 of the operating range 28 thereof, at which the actuation force F approaches 0. Rather, in order to obtain a high closing force, the operating range of the micro-actuator 25 has to be set such that the zero position or central position 29 of a micro-actuator 25 is as low as possible, with respect to the nomenclature in FIG. 6. It proves to be advantageous in this case if the zero position or central position 29 is located within a (lower) tolerance of +/−20 µm (up to +/−50 µm) about the lower diaphragm position 24, which results from the stop 32. Likewise, the upper position 30 of the operating range 28 of the micro-actuator 25 has to be positioned at least 20 µm (up to 50 µm) (upper tolerance) above the position of the sealing surface 13 of the valve element 11, so that the contact surface 27 of the plunger 26 does not touch the diaphragm closing element 21 when the valve element 11 is closed. If the minimum tolerances for the operating range 28 are observed for the micro-actuator 25, a value of 2×(stroke+lower tolerance+upper tolerance)=2×90 µm (2×70 µm to 2×155 µm)=180 µm (~300 µm) is thus obtained.

Figure 8:
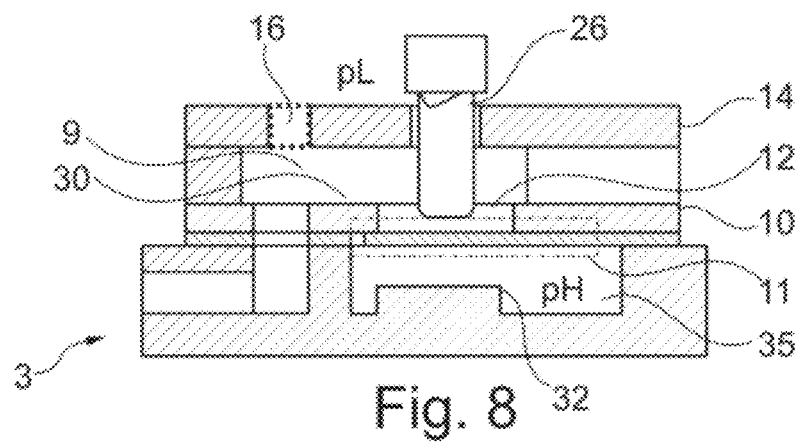
FIG. 8 shows a cross section through a channel of a further special variant of the micro-pneumatic control unit, in which the second bore is provided below the first valve element. Here, the valve element is directly connected on the diaphragm side to the common pressure supply line for the operating pressure (high pressure level) pH. The plunger for actuating the valve element also protrudes through the second plate.

A further embodiment of the micro-pneumatic control unit 3 is shown in the sectional view in FIG. 8. This is characterized by a valve element 11 comprising the previously described valve plate 10 having a valve bore 12 and the underlying diaphragm layer 20 together with the diaphragm closing element 21. In this embodiment, however, the valve element 11 is acted upon directly on the side of the diaphragm layer 20 by the operating pressure (high pressure level) pH, which is made available via a pressure supply line 35. A stop 32 can be located below the valve element 11, as above, for improved definition of the lower diaphragm position or a reference position 33 at which the micro-actuator 35 is aligned in a referencing step. In this embodiment, the cavity 9, together with the connection 19 to the fluid ejector 5, is located above the valve element 11, i.e, above the valve plate 10. The second plate 14 delimits the cavity 9 at the top and is therefore also located above the valve plate 10. In this case, the plunger 26 of the micro-actuator 25 protrudes through the valve bore 12 in the valve plate 10 and additionally through the second opening 16 in the second plate 14, which is arranged concentrically to the valve bore 12 and which, together with the plunger shaft (at least partially) forms the second micro-pneumatic element 15. In this regard, it should be noted that, in a special embodiment, the second bore 16 and the plunger shaft can be designed as a tight clearance fit which only just allows the movement of the plunger, and the micro-pneumatic element 15 can contain a further, second bore 16 (shown by dashed lines) connected in parallel, which opens into the cavity 9 at another point and is designed such that it has a lower flow resistance than the gap of the clearance fit.

With regard to the individual components and assemblies of the micro-pneumatic control unit 3, the following should be added: The plates listed below together with the structures or microstructures thereof contain the large number of channels 2 of the micro-pneumatic control unit 3: The valve plate 10 having the valve bores 12; the second plate 14 having the second bores 16, optional stops 32 or reference positions 33 and optional second valve seats; the diaphragm layer 20 having the recesses 22 which define the diaphragm closing elements 21; the spacer plates 39 having the recesses which determine the lateral shape of the cavity and, furthermore, optional sealing layers. Furthermore, peripheral plates can be added to the list, such as the screw connection plate 41 having all screw holes and required bores; furthermore, the base plate 34 having the pressure supply line 35, having optionally contained stops 32 and connections 19 to the individual fluid ejectors 5.

By means of screw connections 40 at regular narrow intervals of a few millimeters on a line along the channels 2, the plates 10, 14, 20, 39, 41, 34 can be assembled to form a single micro-pneumatic control unit 3 while maintaining close tolerances.

The choice of material and manufacture of the individual plates 10, 14, 20, 39, 41, 34 preferably depends on the desired number of pieces. Plates 10, 14, 20, 39, 41, 34 having a predominantly 3-dimensional extension, such as plate 34 or 40, are preferably made of any solid materials, such as metals (e.g., aluminum, brass, steel, stainless steel, nickel) or plastics materials (solid thermoplastics, thermosetting plastics), and are manufactured using the usual methods. In the case of mass production, the thinner plates 10, 14, 20, 39, 41, 34, such as plates 10, 14 or 39, are preferably made of metals such as copper, brass or stainless steel, which are, for example, etched by wet-chemical etching. The steps shown (plate 14 in FIGS. 3 and 7) can in this case be implemented, for example, by time-controlled etching on both sides. Alternatively, plastics materials can also be used for the thinner plates and/or embossing or forming methods can be used.

The diaphragm layer 20 preferably comprises a single layer and a single material, such as a metal (for example stainless steel, titanium, bronze, nickel) in a thickness in the range of, for example, 10 µm to 100 µm; in this case the production can be carried out by etching or additive (galvanic) processes. Alternatively, the production of the diaphragm layer 20 from high-performance polymers (e.g. PEEK, PI, PTFE, PEI, PVDF) or elastomers (PU, TPE, TPU, silicones and many others) is preferred in different production methods (e.g., embossing, casting, punching, laser structuring, dry etching).

Figure 9:
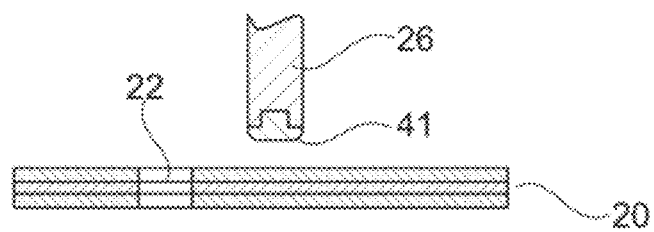
FIG. 9 shows a possible diaphragm structure comprising a plurality of layers and a plunger having a cast-in resilient contact element.

If, during operation, the plunger 26 permanently strikes the diaphragm closing element 21 on a lower stop 32, then the diaphragm and the stop 32 are affected by mechanical wear and the piezo bending transducer 25 is subjected to impact loads at high frequency. These disadvantages can be reduced somewhat by damping the impact contact using resilient materials, for example by means of a plunger tip having a resilient element 41 (FIG. 9). Furthermore, the diaphragm layer can be constructed from a laminate comprising a plurality of individual layers which fulfill different functions. For example, a middle layer made of one of the metals mentioned above can provide a predetermined mechanical stiffness. In addition, an underlying and/or overlying layer made of one of the elastomers can reduce stress peaks which arise when the plunger 26 strikes the diaphragm or the diaphragm strikes the stop 32 and which are transmitted to the piezo bending transducer 25. Conversely, a damping of the diaphragm movements and stress peaks can also be achieved if said diaphragm comprises a layered structure having two outer metal layers and an intermediate polymer, elastomer or viscoelastic layer.

A micro-pneumatic control unit (3) is proposed which comprises a large number of control channels (2) for generating the control pressures (pc) in a pneumatically actuated multi-channel coating head (1) for coating components with a coating agent, a control channel (2) being characterized by a valve element (11) comprising a valve bore (12) in a valve plate (10) and a diaphragm layer (20) which is below the valve plate (10) and is designed as a diaphragm closing element (21) in the region of the valve bore (12), the shape of which diaphragm closing element is determined by recesses positioned laterally with respect to the valve bore (12), by a micro-actuator (25) having a plunger (26) that actuates the diaphragm closing element (21) through the valve bore (12) such that the valve element (11) opens, by a second micro-pneumatic element (15) connected in series with the valve element (11), the control pressure (pc) developing and a cavity (9) being located at the connection node thereof, which cavity is connected to at least one pneumatically operated coating agent ejector (5), and by a pneumatic pressurization of the micro-pneumatic control unit (3), which is directed such that, with respect to the valve element (11), there is a pressure gradient from the diaphragm closing element (21) to the valve bore (12) in the valve plate (10).

We claim:

1. A micro-pneumatic control unit in a pneumatically actuated multi-channel coating head for coating components with a coating agent, comprising:

a plurality of control channels for generating control pressures;
one or more of the plurality of control channels comprising;
 a) a valve element comprising a valve bore in a valve plate and a diaphragm layer which is below the valve plate and is configured as a diaphragm closing element in proximity to the valve bore, the shape of which diaphragm closing element being defined by recesses positioned laterally with respect to the valve bore;
 b) a micro-actuator having a plunger adapted to actuate the diaphragm closing element through the valve bore such that the valve element opens; and
 c) a second micro-pneumatic element connected in series with the valve element, the control pressure developing, and a cavity being located at, the connection node thereof, which cavity is connected to at least one pneumatically operated coating agent ejector;
wherein the micro-pneumatic control unit is adapted for pneumatic pressurization such that, with respect to the valve element, there is a pressure gradient from the diaphragm closing element to the valve bore in the valve plate.

2. A micro-pneumatic control unit according to claim 1, wherein a flow resistance of the second micro-pneumatic element is at least twice as great as a flow resistance of the valve element in the open state.

3. A micro-pneumatic control unit according to claim 1, further comprising a sealing surface in the valve bore, and wherein a load-free operating range of the plunger, with respect to the contact surface thereof, is between 60 µm and 300 µm, with the upper position of the load-free operating range being between 20 µm to 100 µm above the sealing surface and the lower position of the load-free operating range being between 40 µm to 150 µm below the sealing surface.

4. A micro-pneumatic control unit according to claim 3, wherein a central position of the load-free operating range being between 20 µm and 100 µm below the sealing surface.

5. A micro-pneumatic control unit according to claim 1, further comprising a second bore located within a second plate below the valve bore, such that, in a lower diaphragm position, the diaphragm closing element covers the second bore and seals the cavity with respect to an operating pressure at the second bore.

6. A micro-pneumatic control unit according to claim 5, wherein a distance between an upper diaphragm position, in which the diaphragm closing element closes the valve bore, and the lower diaphragm position, in which the diaphragm closing element closes the second bore, is between 30 µm and 80 µm.

7. A micro-pneumatic control unit according to claim 1, wherein the micro-actuator further comprises a piezo bending transducer, and a resilient element adapted to dampen impact loads, wherein the resilient element is located between the piezo bending transducer and the plunger, or on a tip of the plunger.

8. A micro-pneumatic control unit according to claim 1, wherein the diaphragm closing element is connected on one side to the diaphragm layer and is configured as a valve tongue.

9. A micro-pneumatic control unit according to claim 1, wherein the micro-actuator further comprises a bimorph piezo bending transducer having a piezo-lamella, the operating range of the bimorph piezo bending transducer being displaced in the vertical direction in relation to the position of the sealing surface when the piezo-lamella is operated counter to the polarization direction of the bimorph piezo bending transducer.

10. A micro-pneumatic control unit according to claim 9, wherein the voltage at the piezo-lamella is variable.

* * * * *